(12) United States Patent
Abe et al.

(10) Patent No.: US 7,388,715 B2
(45) Date of Patent: Jun. 17, 2008

(54) IMAGING APPARATUS

(75) Inventors: Ryo Abe, Nara (JP); Minoru Ueda, Nara (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 11/592,689

(22) Filed: Nov. 3, 2006

(65) Prior Publication Data

US 2007/0103794 A1 May 10, 2007

(30) Foreign Application Priority Data

Nov. 4, 2005 (JP) .............................. 2005-320640

(51) Int. Cl.
*G02B 15/14* (2006.01)
(52) U.S. Cl. ...................................... 359/680; 359/686
(58) Field of Classification Search ................ 359/676, 359/680–682, 686
See application file for complete search history.

(56) References Cited

U.S. PATENT DOCUMENTS

| 6,088,169 | A | 7/2000 | Ohno |
| 6,606,201 | B1 | 8/2003 | Hirose |
| 7,164,543 | B2 * | 1/2007 | Arai ........................... 359/689 |
| 2004/0136705 | A1 | 7/2004 | Suzuki |
| 2004/0201902 | A1 | 10/2004 | Mihara et al. |
| 2005/0029433 | A1 | 2/2005 | Sakoh et al. |

FOREIGN PATENT DOCUMENTS

| JP | 2002-072095 | 3/2002 |
| JP | 2005-057024 | 3/2005 |

\* cited by examiner

*Primary Examiner*—Ricky Mack
*Assistant Examiner*—Darryl J. Collins
(74) *Attorney, Agent, or Firm*—David G. Conlin; Steven M. Jensen; Edwards Angell Palmer & Dodge LLP

(57) ABSTRACT

First, second, third and fourth lens groups of a zoom lens portion are arranged on an optical axis in order from an object to be imaged side toward an electronic imaging device. The first lens group has a negative refracting power and a fixed position on the optical axis. The second lens group has a positive refracting power and is moved along the optical axis to effect focusing. The third lens group has a positive refracting power and is moved along the optical axis during a magnification change. The fourth lens group has a fixed position on the optical axis. An angle of incidence of a ray of a maximum image height when the zoom lens portion is in a state at a telephoto end is not greater than the angle of incidence of the ray of the maximum image height incident on the electronic imaging device when the zoom lens portion is in a state at a wide angle end. The angle of incidence of the ray of the maximum image height incident on the electronic imaging device when the zoom lens portion is in the state at the telephoto end is not smaller than 5°.

2 Claims, 4 Drawing Sheets

Fig. 4

| No. | | | R | D | n | νd |
|---|---|---|---|---|---|---|
| 1 | 1ST LENS GROUP | SPHERIC | 100.000 | 0.800 | 1.806 | 40.7 |
| 2 | | ASPHERIC | 5.256 | d1 | | |
| 3 | 2ND LENS GROUP | ASPHERIC | 7.295 | 1.078 | 1.821 | 24.1 |
| 4 | | ASPHERIC | 13.539 | d2 | | |
| 5 | | DIAPHRAGM | INFINITY | 0.100 | | |
| 6 | 3RD LENS GROUP | ASPHERIC | 2.776 | 1.256 | 1.589 | 61.3 |
| 7 | | ASPHERIC | -11.362 | 0.311 | | |
| 8 | | SPHERIC | 15.443 | 1.325 | 1.847 | 23.8 |
| 9 | | SPHERIC | 2.984 | d3 | | |
| 10 | 4TH LENS GROUP | ASPHERIC | 283.209 | 1.297 | 1.821 | 24.1 |
| 11 | | ASPHERIC | -28.652 | 1.477 | | |
| 12 | OPTICAL FILTER | | INFINITY | 0.500 | 1.517 | 64.2 |
| 13 | | | INFINITY | | | |

Fig.5

|  | WIDE ANGLE | INTERMEDIATE | TELEPHOTO |
|---|---|---|---|
| ANGLE OF VIEW | 36.6 | 20.4 | 14.6 |
| FOCAL DISTANCE | 4.8 | 9.6 | 13.68 |
| d1 | 4.678 | 1.315 | 1.353 |
| d2 | 4.152 | 3.371 | 0.850 |
| d3 | 2.526 | 6.670 | 9.153 |

Fig.6

| No. | R | k | A | B | C | D |
|---|---|---|---|---|---|---|
| 2 | 5.256 | -0.6015 | -4.05E-05 | 7.42E-05 | -9.89E-06 | 6.02E-07 |
| 3 | 7.295 | -0.8826 | -6.03E-04 | -5.00E-03 | 1.22E-04 | -4.39E-06 |
| 4 | 13.539 | 0.1081 | -1.12E-03 | -5.01E-04 | 1.66E-04 | -6.08E-06 |
| 6 | 2.776 | -0.3576 | 3.61E-03 | 2.23E-03 | -4.31E-05 | 2.80E-04 |
| 7 | -11.362 | -1.0000 | 1.23E-02 | 5.14E-03 | -1.82E-03 | 1.26E-03 |
| 10 | 283.209 | -1.0000 | -1.44E-02 | 1.34E-03 | -2.57E-05 | -2.41E-06 |
| 11 | -28.652 | 1.0000 | -1.47E-02 | 1.26E-03 | -2.68E-05 | -1.04E-06 |

Fig.7

| IMAGE HEIGHT | WIDE ANGLE | TELEPHOTO | DIFFERENCE |
|---|---|---|---|
| 100% | 22.4 | 8.8 | 13.6 |
| 80% | 17.5 | 5.8 | 11.7 |
| 60% | 13.5 | 3.5 | 9.9 |

IMAGING APPARATUS

CROSS-REFERENCE TO RELATED APPLICATIONS

This Nonprovisional application claims priority under 35 U.S.C. §119(a) on patent application No. 2005-320640 filed in Japan on Nov. 4, 2005, the entire contents of which are hereby incorporated by reference.

BACKGROUND OF THE INVENTION

The present invention relates to an imaging apparatus having an electronic imaging device.

On the occasion of imaging with an electronic imaging device, telecentricity on the image side becomes important unlike imaging with a film. Telecentricity means that the principal ray of a pencil of light to each image point becomes almost parallel to the optical axis after being emitted from the final surface of an optical system. That is, it means that the principal ray of the pencil of light to each image point intersects with the image surface almost perpendicularly.

The reason why the telecentricity on the image side becomes important in the electronic imaging device is that oblique incident light is disadvantageously shaded by the aperture of the pixel since the aperture of each pixel of the electronic imaging device is located at a position slightly away from the photodetection portion, causing a reduction in fill factor.

In recent years, a method for increasing the fill factor than that on the actual photodetection surface by arranging a microlens array on the surface of the electronic imaging device is adopted.

A method for preventing the fill factor from being reduced even if the angle of incidence of the ray to the image surface is increased by scaling the microlens, i.e., by arranging the microlens in a position shifted from the position of each pixel in conformity to the angle of incidence of the ray is adopted. The scaling of the microlens can cope with up to an angle of incidence of about 25°.

For example, JP 2005-57024 A proposes a method for providing a flattening film on a plurality of microlenses corresponding to a plurality of photodetectors and suppressing the reduction in fill factor by shifting the positions of the plurality of microlenses from right above the corresponding photodiode toward a center portion as they are located apart from the center portion of the photodetection surface to end portions.

However, since the angle of incidence to the image surface of the ray differs depending on the focal distance, the angle of incidence of the ray to the image surface is disadvantageously changed by the zoom position in the zoom lens where the focal distance changes.

In general, an exit pupil position is located away from the image surface at a telephoto end, and the ray is incident on the photodetection surface almost perpendicularly. In contrast to this, the exit pupil position is located closer to the image surface at a wide angle end, and therefore, the ray of a maximum image height is incident at a large angle on the image surface.

Therefore, a difference in the angle of incidence of the ray of the maximum image height on the image surface between the telephoto end and the wide angle end is consequently increased, and this cannot be managed by the scaling of the microlens.

If the difference in the angle of incidence of the ray of the maximum image height on the image surface between the telephoto end and the wide angle end becomes large, a shift in an image formation position on an imaging device occurs between the telephoto end and the wide angle end, and this causes a blur and the like.

Therefore, it has conventionally been a problem of the zoom lens to bring the angle of incidence of the ray at the wide angle end, at which the exit pupil position is located near the image surface, incident on the image surface close to perpendicular to the surface.

Particularly in recent years, there is a demand for reducing the size of the lens, and it is indispensable to shorten the length of the entire lens. In contrast to this, the length of the entire lens is disadvantageously increased when the exit pupil is set away from the image surface in order to bring the angle of incidence of the ray at the wide angle end close to perpendicular. Therefore, it is more difficult to make the angle of incidence of the ray at the wide angle end perpendicular.

SUMMARY OF THE INVENTION

An object of the present invention is to provide an imaging apparatus capable of preventing the occurrence of a shift in an image formation position on an electronic imaging device between a telephoto end and a wide angle end by reducing a difference in the angle of incidence of a ray of a maximum image height incident on the electronic imaging device between the telephoto end and the wide angle end of a zoom lens.

In order to achieve the above object, an imaging apparatus of the present invention comprises:

a zoom lens portion; and an electronic imaging device placed on an optical axis of the zoom lens portion, wherein the zoom lens portion comprises:

a first lens group that has a negative refracting power and a fixed position on the optical axis with respect to the electronic imaging device;

a second lens group that has a positive refracting power and is moved along the optical axis to effect focusing by correcting a change in an image formation position during a magnification change;

a third lens group that has a positive refracting power and is moved along the optical axis during the magnification change; and a fourth lens group that has a fixed position on the optical axis with respect to the electronic imaging device, the first, second, third and fourth lens groups are arranged in order from an object to be imaged side toward the electronic imaging device, an angle of incidence of a ray of a maximum image height incident on the electronic imaging device when the zoom lens portion is in a state at a telephoto end is not greater than an angle of incidence of the ray of the maximum image height incident on the electronic imaging device when the zoom lens portion is in a state at a wide angle end, and the angle of incidence of the ray of the maximum image height incident on the electronic imaging device when the zoom lens portion is in the state at the telephoto end is not smaller than 5°.

In the imaging apparatus of the present invention, the angle of incidence of the ray of the maximum image height incident on the electronic imaging device is made not smaller than 5° when the zoom lens portion is in the state at the telephoto end. With this arrangement, the difference between the angle of incidence of the ray of the maximum image height at the wide angle end incident on the electronic imaging device and the angle of incidence of the ray of the maximum image height at the telephoto end incident on the electronic imaging device can be made not greater than 15°.

By making the difference between the angle of incidence at the wide angle end and the angle of incidence at the telephoto end not greater than 15°, it is allowed to avoid a blur and the like by reducing the amount of shift in the image formation position of the electronic imaging device between the state at the wide angle end and the state at the telephoto end. When the difference between the angle of incidence at the wide angle end and the angle of incidence at the telephoto end exceeds 15°, a blur and the like easily occur as a consequence of a shift in the image formation position between the state at the wide angle end and the state at the telephoto end.

In the imaging apparatus of one embodiment, a difference between the angle of incidence of the ray of the maximum image height incident on the electronic imaging device when the zoom lens portion is in the state at the telephoto end and the angle of incidence of the ray of the maximum image height incident on the electronic imaging device when the zoom lens portion is in the state at the wide angle end is not greater than 15°.

According to the imaging apparatus of the present embodiment, the difference between the angle of incidence at the telephoto end and the angle of incidence at the wide angle end is not greater than 15°, and therefore, it is allowed to avoid a blur and the like by reducing the amount of shift in the image formation position of the electronic imaging apparatus.

According to the imaging apparatus of the present invention, the angle of incidence of the ray of the maximum image height incident on the electronic imaging device is made not smaller than 5° when the zoom lens portion is in the state at the telephoto end. With this arrangement, the difference between the angle of incidence of the ray of the maximum image height at the wide angle end incident on the electronic imaging device and the angle of incidence of the ray of the maximum image height at the telephoto end incident on the electronic imaging device can be made not greater than 15°. By making the difference between the angle of incidence at the wide angle end and the angle of incidence at the telephoto end not greater than 15°, it is allowed to avoid a blur and the like by reducing the amount of shift in the image formation position of the electronic imaging device.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 4 is a table showing one example of parameters that define the shapes of lens groups owned by the zoom lens portion provided for the embodiment;

FIG. 5 is a table showing an angle of view, a focal distance and lens intervals in the state at the wide angle end, the state at the telephoto end, and the state intermediate between the wide angle end and the telephoto end in the embodiment;

FIG. 6 is a table showing coefficients that define the aspheric surface shape of aspheric lenses of each lens group owned by the embodiment; and FIG. 7 is a table showing a difference in angle of incidence between the state at the wide angle end and the state at the telephoto end in the embodiment.

DETAILED DESCRIPTION OF THE INVENTION

Figure 1:
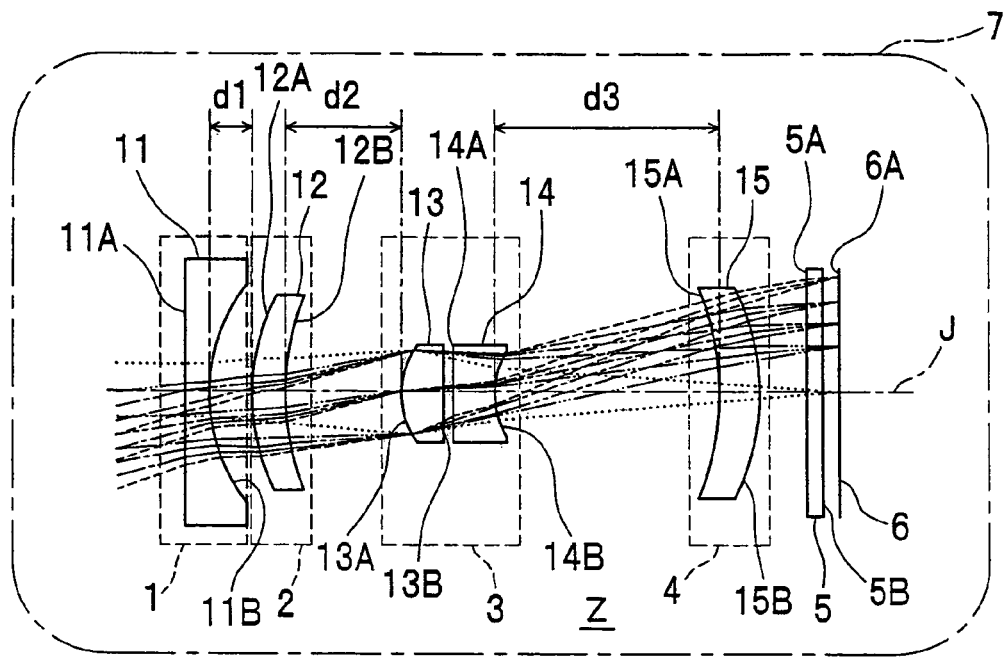
FIG. 1 is a sectional view showing a case where a zoom lens portion is in a state intermediate between a state at the wide angle end and a state at the telephoto end in an embodiment of an imaging apparatus of the present invention.

The present invention will be described in detail by the embodiment shown in the drawings.

FIG. 1 is a sectional view of an imaging apparatus 7 as an embodiment of the present invention. The imaging apparatus 7 includes first through fourth lens groups 1 through 4, an optical filter 5 and an electronic imaging device 6, which are placed in order along an optical axis J. The first through fourth lens groups 1 through 4 constitute a zoom lens portion Z. The first, second, third and fourth lens groups 1, 2, 3 and 4 are arranged in order from the object to be imaged side toward the electronic imaging device 6. The electronic imaging device 6 is constructed of, for example, a solid-state imaging device such as CCD.

The first lens group 1 has a negative refracting power and a fixed position on the optical axis J with respect to the electronic imaging device 6. The second lens group 2 has a positive refracting power and is moved along the optical axis J, effecting focusing through correction on a change in the image formation position during the magnification change. The third lens group 3 has a positive refracting power and is moved along the optical axis J during the magnification change. The fourth lens group 4 has a positive refracting power and a fixed position on the optical axis J with respect to the electronic imaging device 6.

In FIG. 1, the zoom lens portion Z is in a state intermediate between a wide angle end and a telephoto end. The second lens group 2 and the third lens group 3 can be moved along the optical axis J by a drive system (not shown). Therefore, in FIG. 1, a lens interval d1 between the first lens group 1 and the second lens group 2, a lens interval d2 between the second lens group 2 and the third lens group 3, and a lens interval d3 between the third lens group 3 and the fourth lens group 4 are each variable.

Figure 2:
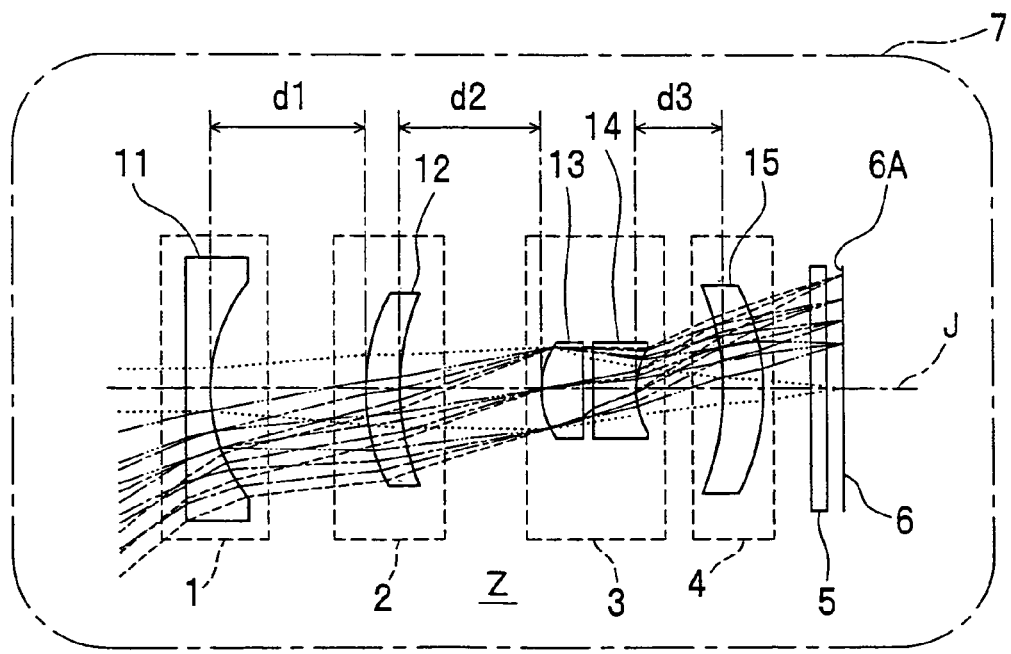
FIG. 2 is a sectional view showing a case where the zoom lens portion is in the state at the wide angle end in the embodiment.

Next, in FIG. 2, the zoom lens portion Z is in the state at the wide angle end. That is, in FIG. 2, the third lens group 3 is moved along the optical axis J to the electronic imaging device 6 side, i.e., an image surface 6A side as compared with the state of FIG. 1, while the second lens group 2 is moved along the optical axis J to the electronic imaging device 6 side as compared with the state of FIG. 1, effecting focusing by correcting a change in the image formation position during a magnification change.

The exit pupil position comes closer to the image surface 6A side in the state at the wide angle end shown in FIG. 2 as compared with the intermediate state shown in FIG. 1, and therefore, the angle of incidence on the image surface 6A becomes larger than in the intermediate state shown in FIG. 1.

Figure 3:
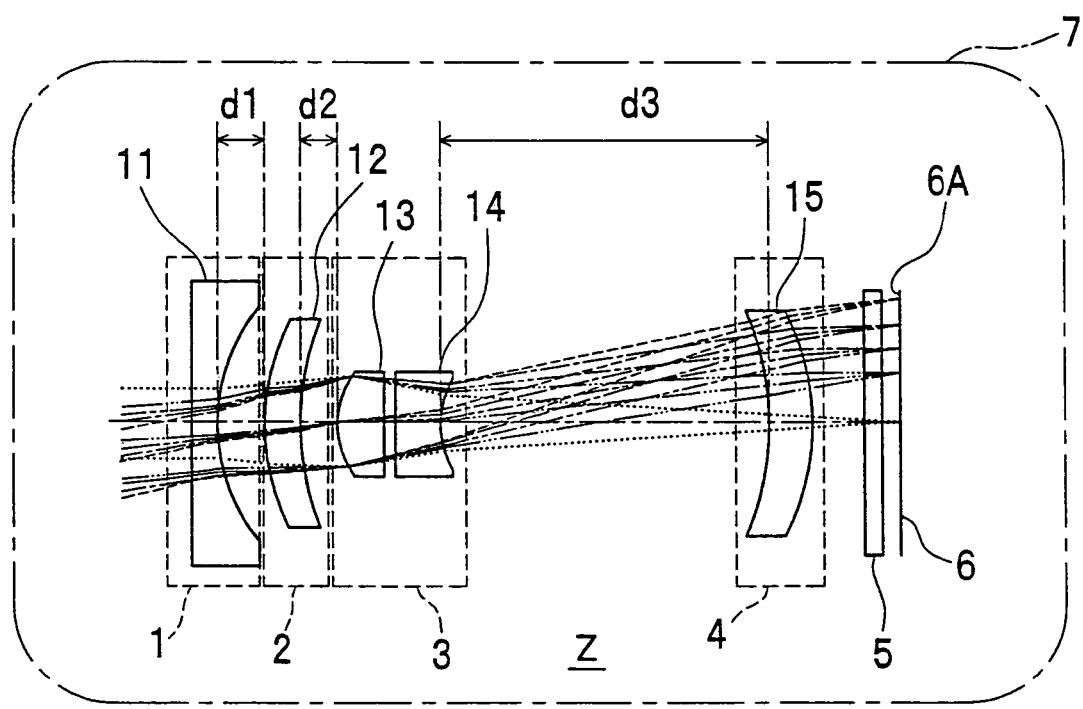
FIG. 3 is a sectional view showing a case where the zoom lens portion is in the state at the telephoto end in the embodiment.

Next, FIG. 3 shows the imaging apparatus 7 in the case where the zoom lens portion Z is in the state at the telephoto end. In the state at the telephoto end of FIG. 3, the second lens group 2 and the third lens group 3 are moved toward the object to be imaged side along the optical axis J, so that the second lens group 2 and the third lens group 3 are located far away from the image surface 6A as compared with the state at the wide angle end of FIG. 2.

In the state at the telephoto end of FIG. 3, the exit pupil position is away from the image surface 6A as compared with the state at the wide angle end of FIG. 2, and the angle of incidence on the image surface 6A at the maximum image height is smaller than in the state at the wide angle end of FIG. 2.

Parameters that define the shapes of the first through fourth lens groups 1 through 4 are described next with reference to the table shown in FIG. 4.

No. 1 of FIG. 4 shows the shape of a lens surface 11A, which is located on the object to be imaged side, of one lens 11 that constitutes the first lens group 1. That is, the lens surface 11A is a spheric surface and has a radius of curvature R of 100 (mm). Moreover, the lens 11 has a center thickness D of 0.800 (mm), a refractive index n of its material is 1.806, and its Abbe number vd is 40.7. It is noted that the center thickness D is the thickness on the optical axis J.

Moreover, as shown in No. 2 of FIG. 4, a lens surface 11B, which is located on the imaging device 6 side, of the lens 11 is an aspheric surface, a radius of curvature R on the optical axis J is 5.256 (mm), and a distance on the optical axis J to a lens 12 that constitutes the second lens group 2 is the lens interval d1.

Moreover, as shown in No. 3 of FIG. 4, a lens surface 12A, which is located on the object to be imaged side, of the lens 12 is an aspheric surface, and a radius of curvature R on the optical axis J is 7.295 (mm). Moreover, the center thickness D of the lens 12 is 1.078 (mm), a refractive index n of its material is 1.821, and its Abbe number vd is 24.1.

Moreover, a lens surface 12B, which is located on the imaging device 6 side, of the lens 12 is an aspheric surface, a radius of curvature R on the optical axis J is 13.539 (mm), and a distance on the optical axis J to a diaphragm (not shown) owned by the third lens group 3 is the lens interval d2.

Moreover, as shown in No. 5 of FIG. 4, the diaphragm (not shown) of the third lens group 3 has an infinite radius of curvature R, and a thickness D on the optical axis J is 0.100 (mm).

Moreover, as shown in No. 6 of FIG. 4, a lens surface 13A, which is located on the object to be imaged side, of a lens 13 owned by the third lens group 3, is an aspheric surface, and a radius of curvature R on the optical axis J is 2.776 (mm). A center thickness D of the lens 13 is 1.256 (mm), a refractive index of its material is 1.589, and its Abbe number vd is 61.3.

Moreover, as shown in No. 7 of FIG. 4, a lens surface 13B, which is located on the imaging device 6 side, of the lens 13 is an aspheric surface, and a radius of curvature R is −11.362 (mm). The negative symbol of the radius of curvature R indicates that the lens surface 13B is convex on the imaging device 6 side. A distance D on the optical axis J between the lens surface 13B of the lens 13 and the adjacent lens 14 is 0.311 (mm).

Moreover, as shown in No. 8 of FIG. 4, a lens surface 14A, which is located on the object to be imaged side, of the lens 14 adjacent to the lens 13 of the third lens group 3 is a spheric surface, and its radius of curvature R is 15.443 (mm). A center thickness D of the lens 14 is 1.325 (mm), a refractive index n of its material is 1.847, and its Abbe number vd is 23.8.

Moreover, as shown in No. 9 of FIG. 4, the lens surface 14B, which is located on the imaging device 6 side, of the lens 14 is a spheric surface, a radius of curvature R is 2.984 (mm), and a distance D on the optical axis J to a lens surface 15A, which is located on the object to be imaged side, of a lens 15 that constitutes the fourth lens group 4 is a lens interval d3.

Moreover, as shown in No. 10 of FIG. 4, the lens surface 15A, which is located on the object to be imaged side, of the lens 15 that constitutes the fourth lens group 4 is an aspheric surface, and a radius of curvature R is 283.209 (mm) A center thickness D of the lens 15 is 1.297 (mm), a refractive index n of its material is 1.821, and its Abbe number vd is 24.1.

Moreover, as shown in No. 11 of FIG. 4, a lens surface 15B, which is located on the imaging device 6 side, of the lens 15 is an aspheric surface, a radius of curvature R is −28.652 (mm), and a distance D on the optical axis J to the optical filter 5 adjacent to the lens surface 15B is 1.477 (mm).

Moreover, as shown in No. 12 of FIG. 4, the surface 5A, which is located opposite to the object to be imaged side, of the optical filter 5 has an infinite radius of curvature R and is flat. With regard to the optical filter 5, a thickness D in the direction of the optical axis is 0.50 (mm), a refractive index n is 1.517, and its Abbe number vd is 64.2. Moreover, a surface 5B, which is located on the imaging device 6 side, of the optical filter 5 has an infinite radius of curvature R and is flat.

Next, FIG. 5 shows an angle of view, a focal distance and lens intervals d1 through d3 in each of the state at the wide angle end of FIG. 2, the intermediate state of FIG. 1 and the state at the telephoto end of FIG. 3 in the imaging apparatus 7 that has the first through fourth lens groups 1 through 4. In the table shown in FIG. 5, the angle of view is in units of angle (°), and the numeric values of the focal distance and the lens interval are in units of mm (millimeters).

Moreover, the shapes of the aspheric surfaces of the aspheric lens surface 11B, the lens surfaces 12A and 12B, the lens surfaces 13A and 13B, the lens surfaces 14A and 14B corresponding to No. 2, No. 3, No. 4, No. 6, No. 7, No. 10 and No. 11 of FIG. 4 are defined by:

$$\phi = (1/R)h^2 \cdot [1 + \{1 - (\kappa+1) \cdot (1/R)^2 \cdot h^2\}^{1/2}]^{-1} + A \cdot h^4 + B \cdot h^6 + C \cdot h^8 + D \cdot h^{10}$$ (Eq. 1)

In equation 1, R is a radius of curvature (mm) on the optical axis J of the lens surface, h is a height (mm) from the optical axis J, and φ is a distance in the direction of the optical axis between a plane that extends the apex of the surface and is perpendicular to the optical axis and the lens surface.

Moreover, in Equation 1, κ, A, B, C and D are coefficients, and lens surfaces 11B, 12A, 12B, 13A and 13B corresponding to No. 1 through No. 11 take the values of the coefficients κ, A, B, C and D, respectively, shown in FIG. 6. It is noted that E-02, E-03, E-04, E-05, E-06 and E-07 represent ×10$^{-2}$, ×10$^{-3}$, ×10$^{-4}$, ×10$^{-5}$, ×10$^{-6}$ and ×10$^{-7}$ in the table shown in FIG. 6.

In the present embodiment, due to the zoom lens portion Z provided for the first through fourth lens groups 1 through 4 as described above, the angle of incidence of the ray of the maximum image height (referred as 100%) incident on the electronic imaging device 6 was set to 8.8° in the state at the telephoto end of FIG. 3 as shown in FIG. 7. In this case, the angle of incidence of the ray of the maximum image height incident on the electronic imaging device 6 was 22.4° in the state at the wide angle end of FIG. 2. Therefore, a difference between the angle of incidence 8.8° at which the ray of the maximum image height was incident on the electronic imaging device 6 when the zoom lens portion Z was in the state at the telephoto end and the angle of incidence 22.4° at which the ray of the maximum image height was incident on the electronic imaging device 6 when the zoom lens portion Z was in the state at the wide angle end was 13.6°.

Moreover, as shown in FIG. 7, the angle of incidence of the ray of a height being 80% of the maximum image height incident on the electronic imaging device 6 was 5.8° in the state at the telephoto end of FIG. 3, while the angle of incidence of the ray of a height being 80% of the maximum image height incident on the electronic imaging device 6 was 17.5° in the state at the wide angle end of FIG. 2. Therefore, a difference between the angle of incidence 5.8° at the telephoto end and the angle of incidence 17.5° at the wide angle end was 11.7° at the image height being 80% of the maximum image height.

Moreover, as shown in FIG. 7, the angle of incidence of the ray of a height being 60% of the maximum image height incident on the electronic imaging device 6 was 3.5° in the state at the telephoto end of FIG. 3, while the angle of incidence of the ray of a height being 60% of the maximum image height incident on the electronic imaging device 6 was 13.5° in the state at the wide angle end of FIG. 2. Therefore, a difference between the angle of incidence 3.5° at the telephoto end and the angle of incidence 13.5° at the wide angle end was 9.9° at the image height being 60% of the maximum image height.

That is, according to the present embodiment, by setting the angle of incidence of the ray of the maximum image height incident on the electronic imaging device 6 to 8.8° being not smaller than 5° when the zoom lens portion Z was in the state at the telephoto end, a difference between the angle of incidence (22.4°) at which the ray of the maximum image height was incident on the electronic imaging device 6 at the wide angle end and the angle of incidence (8.8°) at which the ray of the maximum image height was incident on the electronic imaging device at the telephoto end was able to be set not greater than 15° (13.6°).

As described above, a blur and the like can be avoided by reducing the amount of shift in the image formation position of the electronic imaging apparatus with the difference between the angle of incidence at the wide angle end and the angle of incidence at the telephoto end made not greater than 15°.

Moreover, in the present embodiment, with the change in the angle of incidence of the ray from the state at the wide angle end of the zoom lens portion Z to the state at the telephoto end of the zoom lens portion Z reduced to 15° or less, shading due to the aperture of each pixel of the electronic imaging device 6 can be reduced in each of the state at the wide angle end and the state at the telephoto end of the zoom lens portion Z. Moreover, a zoom ratio of a high magnification of three times can be obtained.

Moreover, according to the present embodiment, the difference in the angle of incidence between the wide angle end and the telephoto end at the maximum image height can be reduced without setting the exit pupil away from the image surface, which is different from the case of the conventional imaging apparatus. Therefore, it is unnecessary to lengthen the entire length of the zoom lens portion Z, and this allows the lens system to be reduced in size.

Although the angle of incidence of the ray of the maximum image height incident on the electronic imaging device 6 was set to 8.8° in the state at the telephoto end in the above embodiment, the change in the angle of incidence of the ray from the state at the wide angle end to the state at the telephoto end of the zoom lens portion Z can be reduced to 15° or less if the angle of incidence of the ray of the maximum image height incident on the electronic imaging device 6 in the state at the telephoto end is set not smaller than 5° (e.g., 6°, 7°, 9°, 10°, . . . ). Therefore, a blur and the like can be avoided by reducing the amount of shift in the image formation position of the electronic imaging apparatus, and the shading due to the aperture of each pixel of the electronic imaging device 6 can be reduced, allowing the lens system to be reduced in size.

Moreover, if the microlens is arranged so as not to cause shading at a certain specific angle of incidence when a method for increasing the fill factor more than that on the actual photodetection surface by arranging the microlens array on the surface of the electronic imaging device is adopted, the ray collected by the microlens is disadvantageously partially shaded by the photodetector aperture at other angles of incidence. However, the shading of the microlens can be reduced by reducing the difference in the angle of incidence between the telephoto end and the wide angle end, and a reduction in the quantity of light can be prevented.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

The invention claimed is:

1. An imaging apparatus comprising:
a zoom lens portion; and
an electronic imaging device placed on an optical axis of the zoom lens portion, wherein
the zoom lens portion comprises:
a first lens group that has a negative refracting power and a fixed position on the optical axis with respect to the electronic imaging device;
a second lens group that has a positive refracting power and is moved along the optical axis to effect focusing by correcting a change in an image formation position during a magnification change;
a third lens group that has a positive refracting power and is moved along the optical axis during the magnification change; and
a fourth lens group that has a fixed position on the optical axis with respect to the electronic imaging device,
the first, second, third and fourth lens groups are arranged in order from an object to be imaged toward the electronic imaging device,
an angle of incidence of a ray of a maximum image height incident on the electronic imaging device when the zoom lens portion is in a state at a telephoto end is not greater than an angle of incidence of the ray of the maximum image height incident on the electronic imaging device when the zoom lens portion is in a state at a wide angle end, and
the angle of incidence of the ray of the maximum image height incident on the electronic imaging device when the zoom lens portion is in the state at the telephoto end is not smaller than 5°.

2. The imaging apparatus as claimed in claim 1, wherein a difference between the angle of incidence of the ray of the maximum image height incident on the electronic imaging device when the zoom lens portion is in the state at the telephoto end and the angle of incidence of the ray of the maximum image height incident on the electronic imaging device when the zoom lens portion is in the state at the wide angle end is not greater than 15°.

* * * * *